United States Patent
Dornback

(10) Patent No.: US 9,907,300 B1
(45) Date of Patent: Mar. 6, 2018

(54) MOSQUITO ABATEMENT SYSTEM

(71) Applicant: Jason Dornback, Carrollton, TX (US)

(72) Inventor: Jason Dornback, Carrollton, TX (US)

( * ) Notice: Subject to any disclaimer, the term of this patent is extended or adjusted under 35 U.S.C. 154(b) by 141 days.

(21) Appl. No.: 14/957,387

(22) Filed: Dec. 2, 2015

(51) Int. Cl.
*A01M 99/00* (2006.01)
*A01M 29/34* (2011.01)
*A01M 29/30* (2011.01)
*A01M 1/10* (2006.01)

(52) U.S. Cl.
CPC ............ *A01M 1/106* (2013.01); *A01M 29/30* (2013.01); *A01M 29/34* (2013.01); *A01M 99/00* (2013.01)

(58) Field of Classification Search
CPC ........ A01M 1/00; A01M 1/103; A01M 1/106; A01M 1/24; A01M 29/00; A01M 29/30; A01M 29/34; A01M 99/00
USPC ........... 43/118, 119, 121, 124, 132.1; 5/414; 135/87
See application file for complete search history.

(56) References Cited

U.S. PATENT DOCUMENTS

| | | | | |
|---|---|---|---|---|
| 1,053,251 A | * | 2/1913 | Verzani ........... | A01M 2200/012 43/119 |
| 1,255,485 A | * | 2/1918 | Stoffel ............ | A01M 2200/012 43/118 |
| 1,544,334 A | * | 6/1925 | Martin ..................... | A01M 1/02 43/119 |
| 4,716,594 A | * | 1/1988 | Shannon .............. | A41D 13/001 2/4 |
| 5,214,797 A | * | 6/1993 | Tisdale ................ | A41D 13/001 2/4 |
| 5,600,850 A | * | 2/1997 | Shannon .............. | A41D 13/001 2/4 |
| 6,728,969 B2 | * | 5/2004 | Zeiler .................. | A41D 13/001 2/4 |
| 8,950,108 B1 | * | 2/2015 | Morris .................. | A01M 1/106 43/107 |
| 2006/0048442 A1 | * | 3/2006 | Leming .................... | A01M 1/04 43/119 |
| 2009/0288334 A1 | * | 11/2009 | Alexander .......... | A01G 13/0281 43/131 |
| 2010/0132245 A1 | * | 6/2010 | Vestergaard Frandsen .............. | A01M 29/34 43/132.1 |
| 2012/0141756 A1 | * | 6/2012 | Ramaioli .............. | A41D 13/001 428/213 |
| 2014/0041285 A1 | * | 2/2014 | Russell ................ | A01K 13/006 43/132.1 |

* cited by examiner

*Primary Examiner* — Darren W Ark
*Assistant Examiner* — Brady W Frazier
(74) *Attorney, Agent, or Firm* — Eldredge Law Firm; Richard G. Eldredge

(57) ABSTRACT

A mosquito abatement system comprising a fabric and an embedded network of components containing one or more orifices with rigid edges wherein the rigid edges of the orifices trap, damage, or sever the mouthparts of the mosquito such that the mosquito is unable to bite future hosts.

5 Claims, 4 Drawing Sheets

MOSQUITO ABATEMENT SYSTEM

BACKGROUND

1. Field of the Invention

The present invention relates generally to mosquito abating systems, and more specifically, to a mosquito abating fabric system that damages the mouthparts of the mosquito.

2. Description of Related Art

Mosquito abatement systems are well known in the art and are effective means to block mosquitos in order to prevent mosquito bites. For example, FIG. 1 depicts a conventional mosquito abating fabric system 101 having a fabric 103 that has been impregnated with chemical means 105 that are repulsive or damaging to mosquitos. During use, the fabric 101 is incorporated into netting that is draped around an area thus blocking mosquitos from entering the area or incorporated into clothing and worn in order to repel mosquitos away from the wearer and damage mosquitos that come in contact with the fabric.

One of the problems commonly associated with system 101 is that chemical means are relied upon for deterring the mosquitos which can be unsatisfactory. For example, individuals may have allergies to the chemical used in the material or individuals may be averse to the potential environmental impact of the chemicals.

Accordingly, although great strides have been made in the area of mosquito repellant fabrics, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
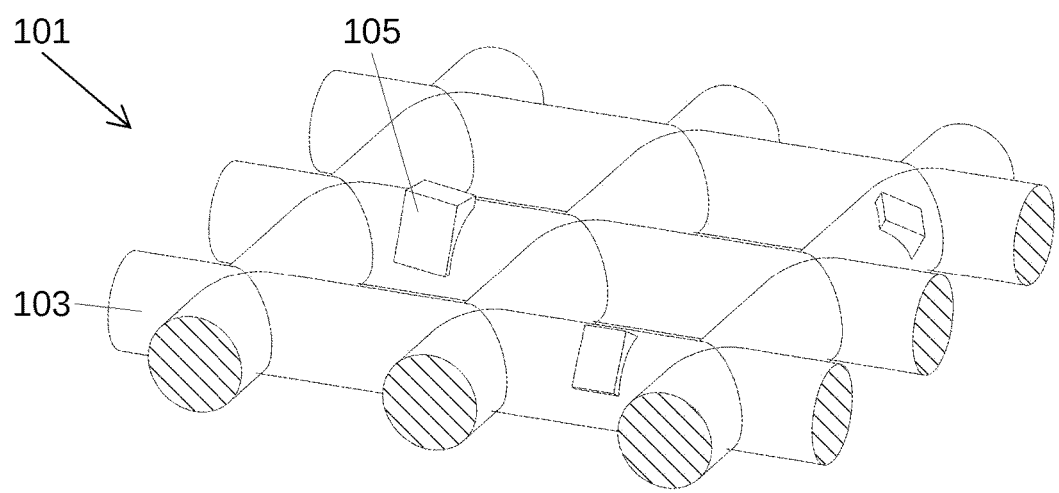
FIG. 1 is a front perspective, sectional view of a common mosquito abating fabric system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional mosquito abating fabric systems. Specifically, the invention abates mosquitos without the use of chemical means. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
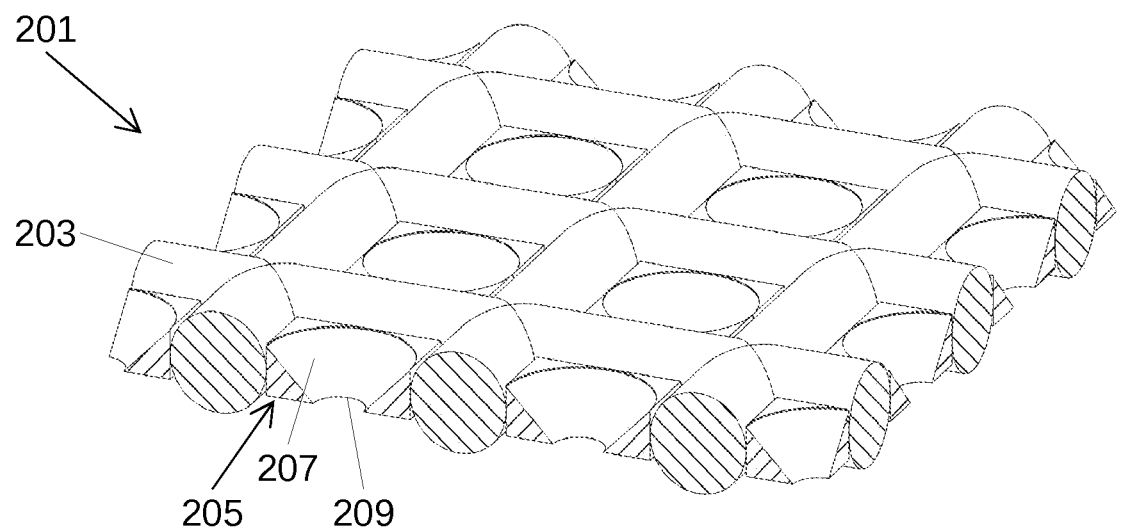
FIG. 2A is a front perspective, sectional view of a mosquito abating fabric system in accordance with a preferred embodiment of the present application.

Referring now to the drawings wherein like reference characters identify corresponding or similar elements throughout the several views, FIG. 2A depicts a front perspective, sectional view of a mosquito abating fabric system in accordance with a preferred embodiment of the present application. It will be appreciated that system 201 overcomes one of more of the above-listed problems commonly associated with conventional mosquito abating fabric systems.

Figure 2B:
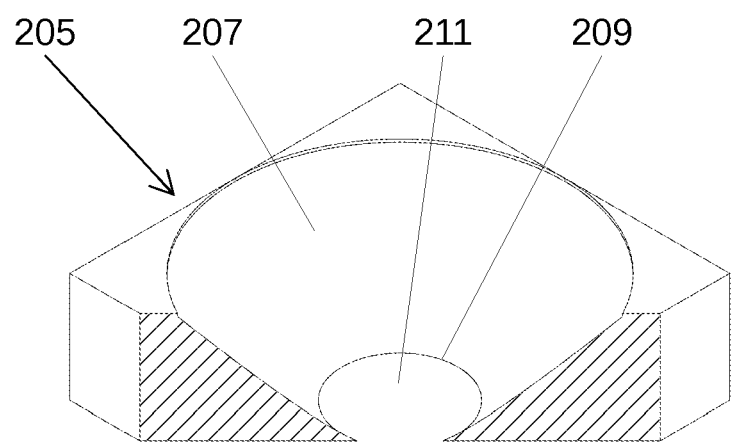
FIG. 2B is an isometric perspective, sectional view of the mosquito abating device from FIG. 2A.

In the contemplated embodiment, system 201 includes fabric 203 with a network of component 205 embedded therein. Component 205 is visualized in FIG. 2B in isometric perspective, sectional view and includes a directing surface 207 that guides a mosquitos mouthparts toward and through orifice 211. Orifice 211 is collared by rigid edge 209.

It should be appreciated that one of the unique features believed characteristic of the present application is that system 201 is a mosquito abating fabric that does not use chemical means. Instead, component 205, which is dispersed in the fabric, is used to render the fabric mosquito-abating. It does so by damaging the mouthparts of the mosquito. When a mosquito attempts to pass its mouthparts through the fabric the mouthparts are guided, via the directing surface 207, toward and through orifice 211 whose diameter is similar to the diameter of the mouthparts of a mosquito. The design of rigid edge 209, in conjunction with orifice 211, allows passage of the mosquito mouthparts only in one direction. When the mosquito attempts to retract its mouthparts from orifice 211, rigid edge 209 acts to cut or otherwise damage the mouthparts. This renders the mosquito unable to utilize mouthparts for penetration through the skin of subsequent hosts and, further, will ultimately lead to mosquito death.

Figure 3A:
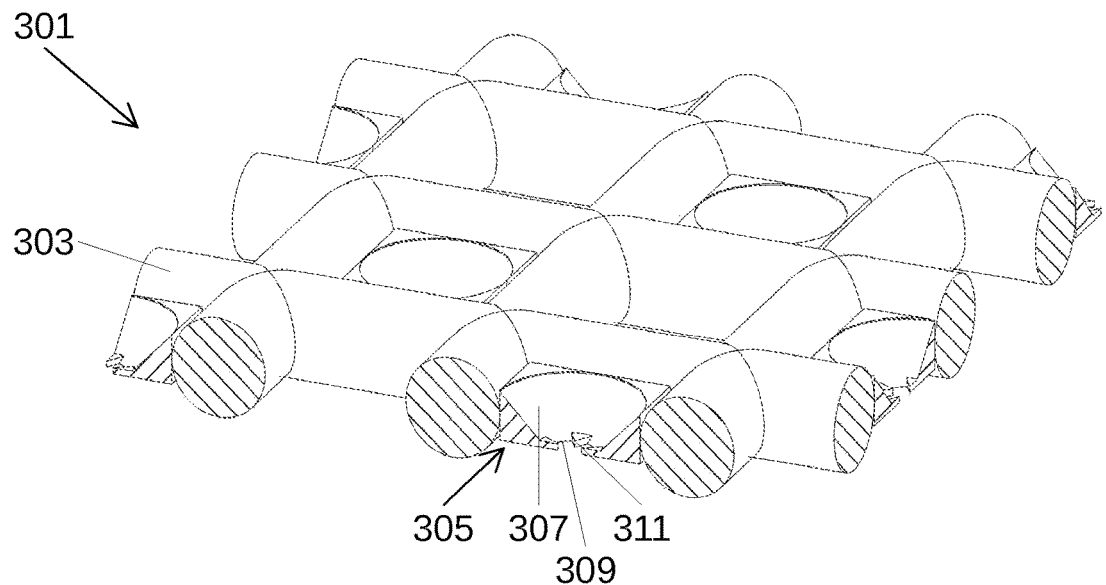
FIG. 3A is a front perspective, sectional view of a mosquito abating fabric system in accordance with an additional embodiment of the present application.

Referring now to FIG. 3A, a front perspective, sectional view of system 301 is shown in accordance with an alternative embodiment of the present application. System 301 is substantially similar in function to system 201 and it is contemplated interchanging the features of the different types of the systems discussed herein.

In this embodiment, system 301 includes fabric 303 with a network of component 305 embedded therein. Component 305 is visualized in FIG. 3B in isometric perspective, sectional view and includes a directing surface 307 that guides a mosquitos mouthparts toward and through orifice 313. Orifice 313 is collared by rigid edge 309. Rigid edge 309 is embellished by teeth 311. It is appreciated that system 301 contains all of the advantages and features of system 201 due to the substantial similarities.

Figure 3B:
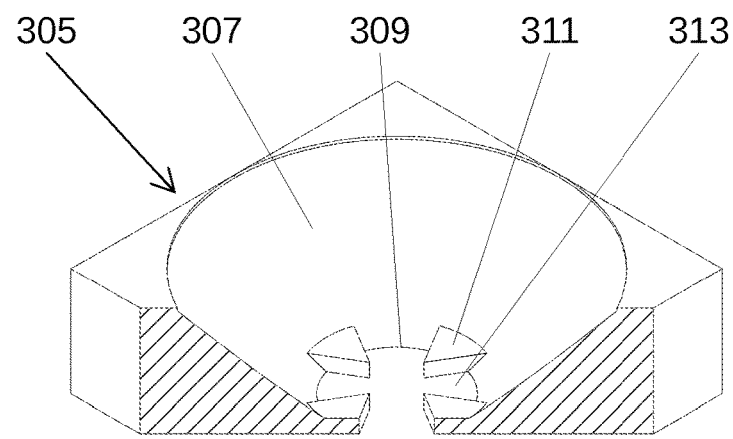
FIG. 3B is an isometric perspective, sectional view of the mosquito abating device from FIG. 3A.

As depicted in FIG. 3B, teeth 311 are included in component 305 near orifice 313. The teeth act to damage the mouthparts of a mosquito. They are intended, in this sense, to act in a manner similar to rigid edge 309.

Figure 4:
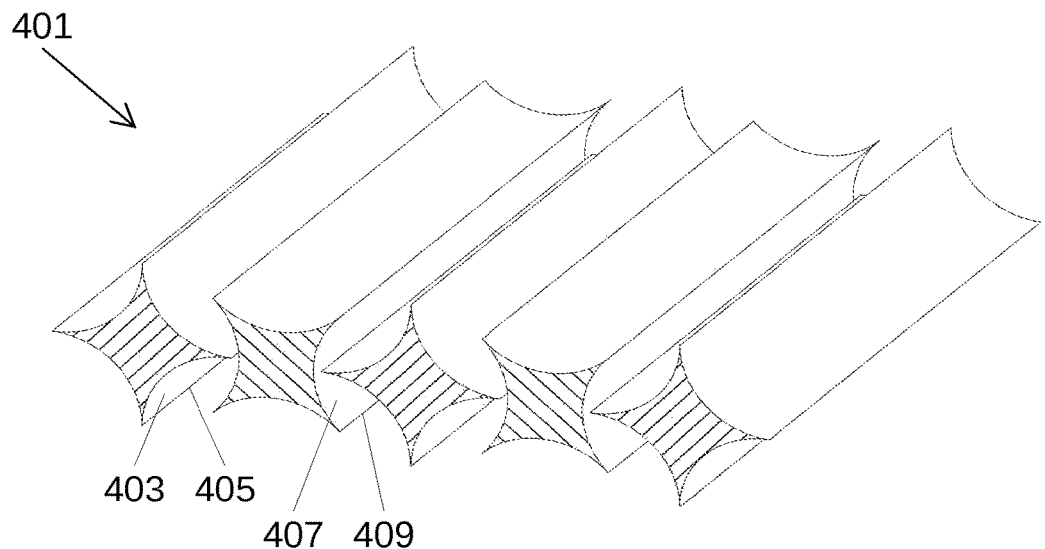
FIG. 4 is a front perspective, sectional view of a mosquito abating fabric system in accordance with an additional embodiment of the present application.

Referring now to FIG. 4, a front perspective, sectional view of system 401 is shown in accordance with an alternative embodiment of the present application. System 401 implements the functional features of component 205 into the threads of the mosquito abating fabric and is thus substantially similar in function to system 201.

In the contemplated embodiment, system 401 includes one or more overlapping threads 403 and 407 respectively comprising one or more damaging edges 405 and 409.

Thread 403 and thread 407 are sufficiently close to each other that when a mosquito attempts to pass its mouthparts between the interleaved threads the mouthparts are damaged by the thread edges. System 401 achieves the function of system 201 without the use of component 205 by incorporating the utility of component 205 into edges 405 and 409.

Figure 5:
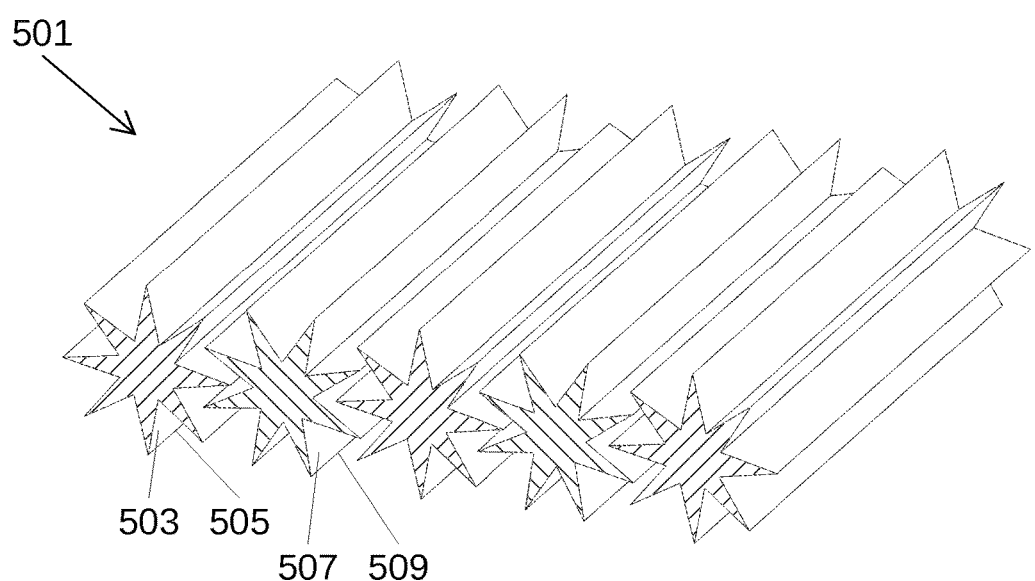
FIG. 5 is a front perspective, sectional view of a mosquito abating fabric system in accordance with an additional embodiment of the present application.

Referring now to FIG. 5, a front perspective, sectional view of system 501 is shown in accordance with an alternative embodiment of the present application. System 501 is substantially similar in function to system 401 and it is contemplated interchanging the features of the different types of the systems discussed herein.

In this embodiment, system 501 includes one or more overlapping threads 503 and 507 respectively comprising one or more damaging edges 505 and 509. It is appreciated that system 501 contains all of the advantages and features of system 401 due to the substantial similarities.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

I claim:

1. A mosquito abating fabric system comprising:
   one or more fabrics; and
   an embedded network of a plurality of components, each of the plurality of components having:
   a top circular opening and a bottom circular orifice, the top circular opening having a diameter larger than the bottom circular orifice;
   a directing surface extending from the top circular opening to the bottom circular orifice, thereby creating a conical shape;
   a rigid edge extending around a periphery of the bottom circular orifice, the rigid edge is configured to engage with a mouthpart of a mosquito, the bottom circular orifice is sized so only the mouthpart of the mosquito can pass therethrough; and
   wherein the directing surface guides the mouthpart of the mosquito towards the bottom circular orifice and to the rigid edge;
   wherein the rigid edge of the bottom circular orifice traps, damages, or severs the mouthparts of the mosquito.

2. The system of claim 1, wherein the bottom circular orifice allows unidirectional passage of a mosquito's mouthparts.

3. The system of claim 1, the one or more rigid edges, wherein the edges are embellished by teeth extending from the rigid edge towards a center of the circular orifice.

4. The system of claim 1 wherein the bottom circular orifice and one or more rigid edges are integral to the threads of the one or more fabrics.

5. The system of claim 1 wherein the one or more directing surfaces, one or more orifices, and one or more rigid edges are integral to the threads of the one or more fabrics.

\* \* \* \* \*